(No Model.)  4 Sheets—Sheet 1.

J. C. HENRY.
SPEED CHANGING MECHANISM.

No. 345,057. Patented July 6, 1886.

WITNESSES:

INVENTOR
John C. Henry (No Model.) 4 Sheets—Sheet 3.
J. C. HENRY.
SPEED CHANGING MECHANISM.
No. 345,057. Patented July 6, 1886.
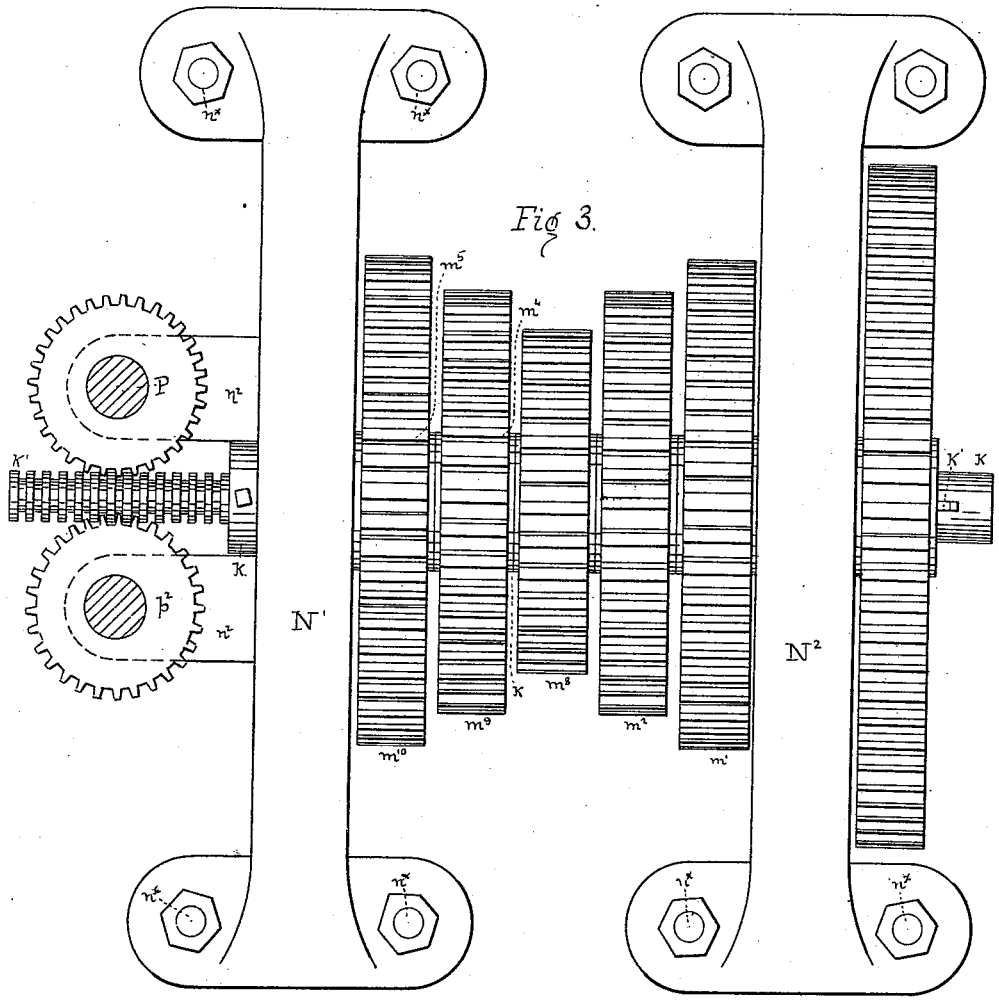
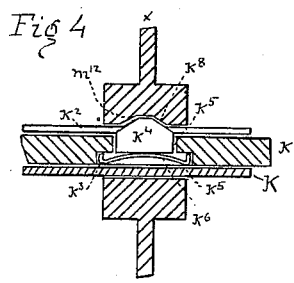
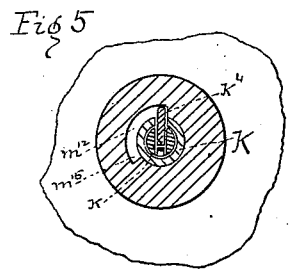
WITNESSES:
F. W. Tuttle
Wm. H. Byram
INVENTOR
John C. Henry (No Model.) 4 Sheets—Sheet 4.
J. C. HENRY.
SPEED CHANGING MECHANISM.
No. 345,057. Patented July 6, 1886.
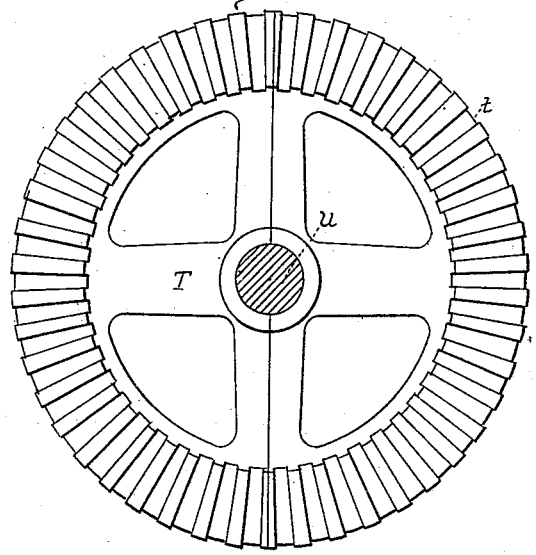
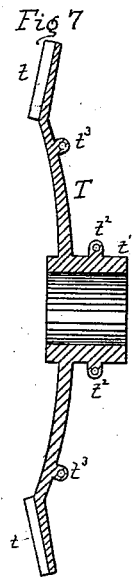
Fig. 6  Fig. 7
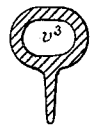
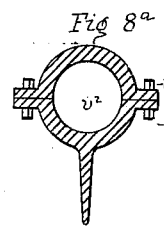
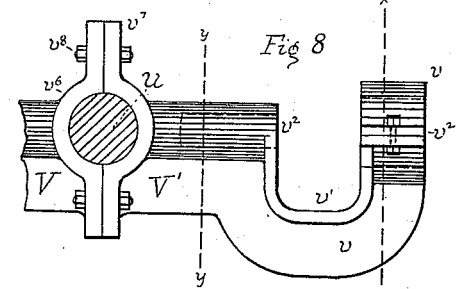
Fig. 8ᵇ  Fig. 8ᵃ  Fig. 8
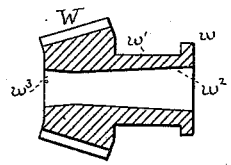
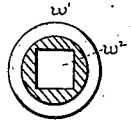
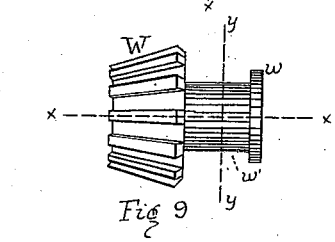
Fig. 9ᵃ  Fig. 9ᵇ  Fig. 9
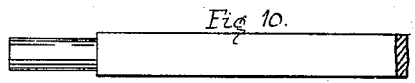
Fig. 10.
WITNESSES
F. W. Tuttle
Wm. H. Byram
INVENTOR
John C. Henry

UNITED STATES PATENT OFFICE.

JOHN C. HENRY, OF KANSAS CITY, MISSOURI.

SPEED-CHANGING MECHANISM.

SPECIFICATION forming part of Letters Patent No. 345,057, dated July 6, 1886.

Application filed May 28, 1885. Serial No. 166,919. (No model.)

*To all whom it may concern:*

Be it known that I, JOHN C. HENRY, a citizen of the United States, residing at Kansas City, in the county of Jackson and State of Missouri, have invented certain new and useful Improvements in Speed-Changing Mechanism; and I do hereby declare that the following is a full, clear, and exact description of the invention, which will enable others skilled in the art to which it appertains to make and use the same, reference being had to the accompanying drawings, forming a part of this specification.

My invention relates to speed-changing mechanism, and is designed more particularly for vehicles propelled by electricity; and it consists in the novel mechanism connected with and arranged between the driving-shaft of the motor on the car and the car-wheels, for conveying power to the wheels and varying the degree of power or speed so conveyed independently of the power or speed of the motor.

Figure 1:
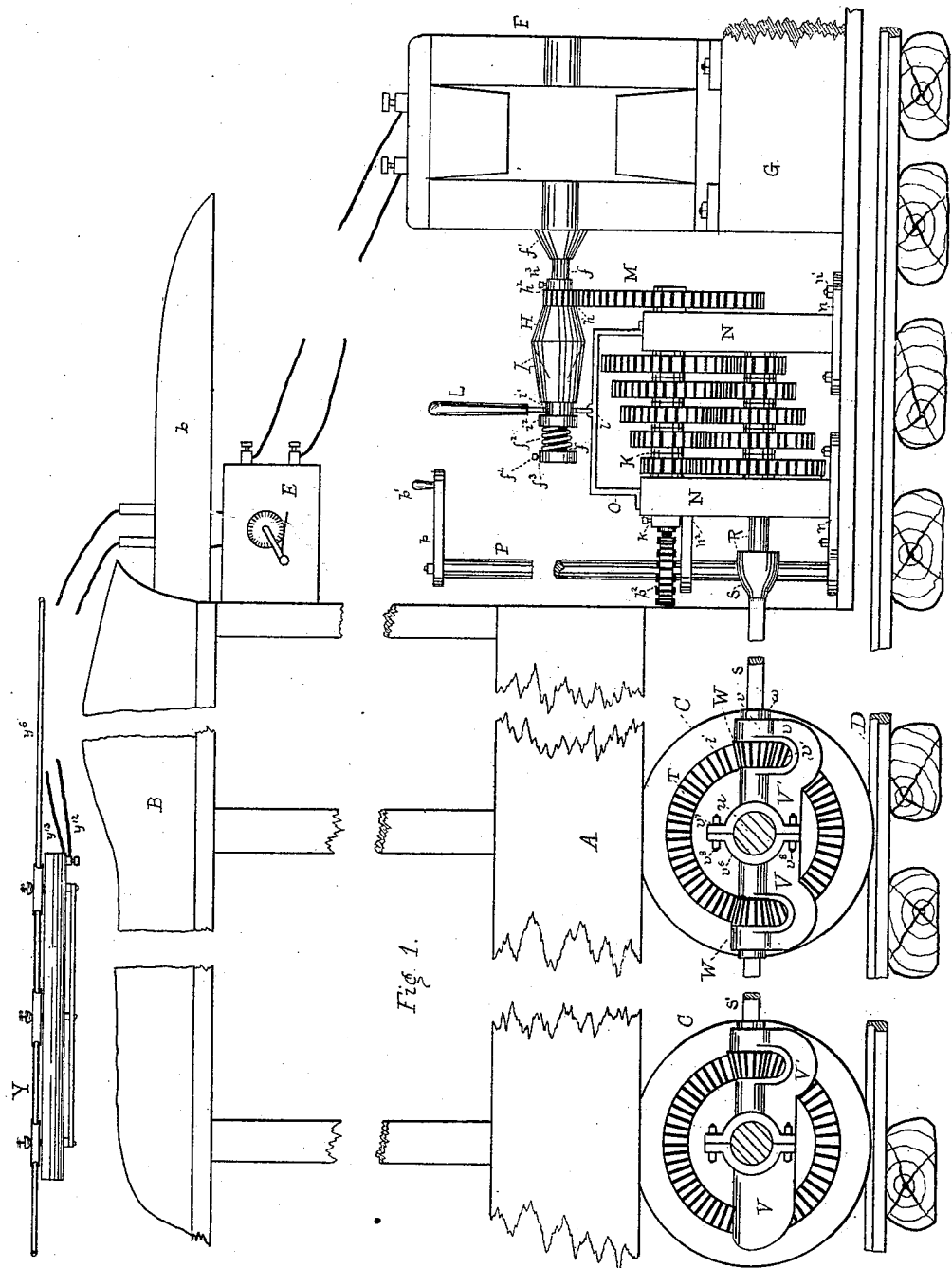
Figure 2:
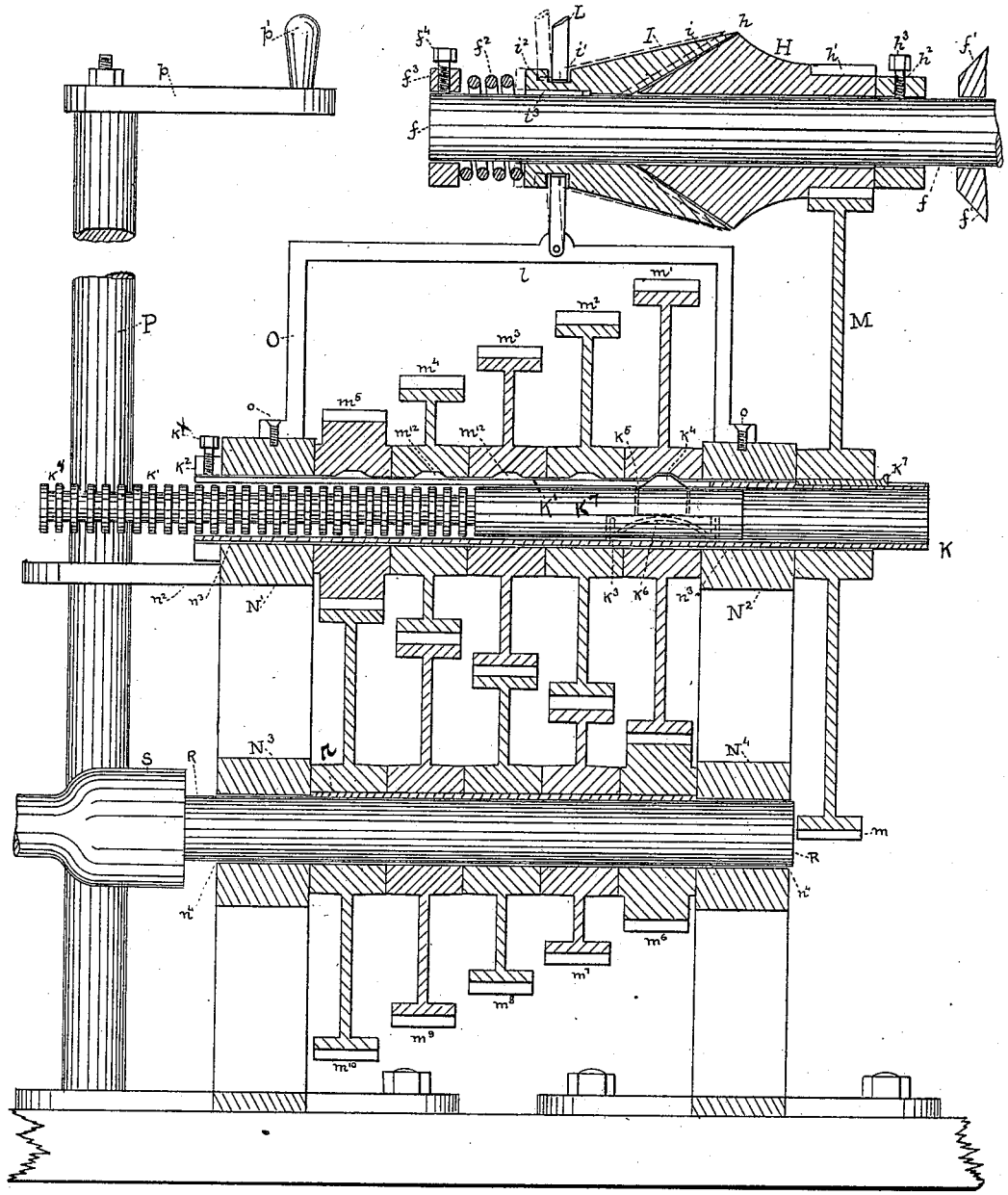

In the drawings, Figure 1 is a side elevation of a car, showing mechanism on the car for conveying power to and varying the speed of the car-wheels. Fig. 2 is a longitudinal sectional elevation of the speed-changing mechanism on the platform of the car. Fig. 3 is a plan view of the speed-changing mechanism as seen in Fig. 2. Fig. 4 is a longitudinal sectional view taken through the slotted sleeve and plunger, and showing a portion of the spur-gear and the automatic key engaging therewith. Fig. 5 is a transverse sectional view of Fig. 4, showing the groove on the inner portion of the gear and the automatic key. Fig. 6 is a side elevation of the split bevel-gear, enlarged, upon the axle of the car. Fig. 7 is a transverse sectional view of the bevel-gear as seen in Fig. 6, showing the lugs for securing the opposite parts together. Fig. 8 is an enlarged side view of the pinion-hanger. Fig. $8^a$ is a vertical transverse sectional view taken on the line $x\,x$ of Fig. 8. Fig. $8^b$ is a vertical transverse sectional view taken on the line $y\,y$ of Fig. 8. Fig. 9 is an enlarged side view of the pinion in the pinion-hanger, which meshes with the bevel-gear on the axle. Fig. $9^a$ is a longitudinal sectional view taken on the line $x\,x$ of Fig. 9. Fig. $9^b$ is a transverse sectional view of the portion of the pinion, taken on the line $y\,y$ of Fig. 9. Fig. 10 is a side view of the shaft connecting the speed-changing mechanism with the bevel-gear on the axle of the car.

Upon the end platform of a car, which is preferably lower in position than the body A of said car, for the convenient operation of the power-conveying and speed-changing mechanism, and upon a suitable support, G, thereon, I mount the electric motor F. The driving-shaft $f$ of said motor F is extended longitudinally beyond the said motor a suitable distance, and upon said shaft I arrange the friction-clutch H I. The portion H of said clutch is placed on the shaft $f$ nearest the motor F, and rotates independently of said shaft, and is constructed with a cone-shaped periphery, $h$, extending in the direction of the end of said shaft $f$, and upon the side toward the motor F is provided with a pinion, $h'$, rigidly attached to said portion of the clutch and rotating therewith. The opposite portion, I, of said clutch is provided with a cone-shaped recess, $i$, adapted to receive the periphery $h$ of the portion H, and is elongated in the direction of the end of shaft $f$, and provided with a flange, $i^2$, and a grooved neck, $i'$, and is keyed on the shaft $f$ by the key $i^3$, in such a manner as to permit the said portion I of the clutch a longitudinal sliding movement on and compel its rotation with said shaft.

Between the bearing $f'$ for the shaft $f$ on the motor F and the portion H of the friction-clutch I arrange a collar, $h^2$, which is secured rigidly upon the shaft $f$ by the screw-bolt $h^3$. A spring, $f^2$, is then arranged upon shaft $f$, which bears against the flange $i^2$ of the portion I of the clutch, and its tension is increased and diminished by an adjustable collar, $f^3$, which is placed over the end of shaft $f$ and against the spring $f^2$, and secured to said shaft by the screw-bolt $f^4$. I then construct a framework for supporting the shafts of the speed-changing mechanism, with the standards N N of said frame placed at suitable distances apart, and connected with the transverse top plates, N' N², which are secured by the bolts $n^x\ n^x$ to the top of said standards, as seen in the plan view in Fig. 3. The lower plates, N³ N⁴, are secured by bolts from the inside to said standards N N. These standards N N are attached at the lower ends to the foot-plates $n$, which foot-plates are secured to the platform of the car by the bolts $n'$. A frame, O, is then made to extend at right angles from one rear to a forward transverse top plate, and of a suitable height above the speed-changing mechanism and slightly to one side of the shaft $f$, and is attached to said transverse plates $N'$ $N^2$ by the screws $o$ $o$. A lever, L, is then pivoted at its lower end by means of the pin $l$ to the top of the frame O, and extends upward above the portion I of the friction-clutch, and has its bearing in the groove $i'$ in said portion of the clutch.

The transverse plates $N'$ $N^2$ are provided with the bearings $n^3$ $n^3$ in a longitudinal direction to the supporting-frame N N, to receive the slotted sleeve K, and permit its free rotation therein. Upon this sleeve K and between the opposite bearings $n^3$ $n^3$, I fit loosely a series of spur-gear, $m'$, $m^2$, $m^3$, $m^4$, and $m^5$, varying with respect to each other in diameter, and having the spurs thereon numbered progressively, and in proportion to the diameter of each gear—as, for instance, gear $m^5$ is provided with ten spurs, gear $m^4$ twenty spurs, gear $m^3$ thirty spurs, gear $m^2$ forty spurs, gear $m'$ fifty spurs, or in similar ratio more or less, as desired. Sleeve K is made to project a slight distance beyond the bearing $n^3$ in the transverse plate $N'$, to receive a collar, $K^2$, which is rigidly secured to the sleeve K by a screw-bolt, $K^\times$. Sleeve K also extends outwardly beyond its bearing $n^3$ in the transverse plate $N^2$ a suitable distance to receive the main driving-gear M, which in diameter is larger than the meshing series of variable gear, and extends to and meshes with the pinion $h'$ on the friction-clutch, and is held rigidly on sleeve K by the spline $k^7$ and rotates with said sleeve. Sleeve K is provided with a longitudinal slot, $k'$, which extends also transversely through one side of said sleeve and to within a suitable distance of the opposite end to permit the engagement of the automatic key $k^4$ with the screws of spur-gear on said sleeve.

Within the sleeve K, I fit a reciprocating cylindrical plunger, $k^7$. This plunger $k^7$ is made to extend outwardly beyond the sleeve K, and a circular rack, $k^8$, formed on said plunger, extending from its outer end a greater part of its length. Near the opposite end of the plunger, or that within the sleeve K, and in said plunger, I make a longitudinal transverse slot, $k^5$, of suitable dimensions to receive the automatic key $k^4$, which key extends a suitable distance within said slot, and upon the opposite side of said plunger I make a longitudinal slot, $k^3$, of increased length to that of slot $k^5$, and communicating with said slot and within slot $k^5$, I place a spring, $k^6$, which bears against the lower end of the key $k^4$, whereby the said key $k^4$ is enabled to be thrown a suitable distance through the slot $k'$ in sleeve K, and also the proper distance beyond the outer circumference of the sleeve. The hub of each spur-gear upon sleeve K is formed interiorly with a groove, $m^{12}$, (see Fig. 4,) which is concentric to said gear, and is contracted sufficiently within the lateral dimensions of each respective hub to receive the automatic key, and extends but a fractional distance around said hub to accomplish the desired results. The sides of the grooves in the respective hubs are inclined in opposite directions, the groove being wider in formation near the sleeve K, and suitably to the formation of the automatic key $k^4$, said key being made with its outwardly-projecting surfaces inclined in opposite directions, and which construction facilitates the entrance and withdrawal of said key from the said groove $m^{12}$. Upon the engagement of the key $k^4$ with the groove $m^{12}$ and that portion of the hub of the spur-gear during the rotation of the sleeve K the sudden shock arising therefrom is brought upon the terminal ends of the groove, and to prevent the wear at those points in the resistance I provide the ends of said groove with pieces of hardened metal, $m^{15}$, as seen in Fig. 5.

A suitable distance below the sleeve K and the gear mounted on said sleeve I arrange upon a shaft, R, in opposite relations, so as to mesh with the gear $m'$, $m^2$, $m^3$, $m^4$, and $m^5$, the variable gear $m^6$, $m^7$, $m^8$, $m^9$, and $m^{10}$, the diameter of which latter gear is made of the same relative proportions as the former gear, and are placed in position on the shaft so that the larger gear in the series will engage with the smaller in their order. The shaft R, carrying the spur-gear $m^6$, $m^7$, $m^8$, $m^9$, and $m^{10}$, extends through and is supported in the bearings $n^4$ $n^4$ in the transverse plates $N^3$ $N^4$, and said spur-gear is mounted thereon and fixed rigidly, so as to rotate with said shaft R, by a spline, $r$, which extends a slight distance into the shaft, and also into the hub of each spur-gear and longitudinally on the said shaft between the bearings $n^4$ $n^4$. A vertical shaft, P, is fitted movably at one end in a rotary relation to the foot-plate $n$, beneath the standards N, and extended upwardly through a suitable perforation in one of the arms $n^2$ $n^2$, which arms are attached to the transverse plates $N'$ and extend horizontally therefrom and in the direction of the body A of the car. A pinion, $p^2$, is rigidly keyed on shaft P and engages with the circular rack $k^8$ on plunger $k^7$, upon one side. A pinion, $p^2$, is then arranged upon a pivot extending from an opposite extended arm, said pinion engaging with the circular rack $k^8$ upon an opposite side, and thereby assisting the direct withdrawal of the plunger. The shaft P is provided with a lever, $p$, and handle $p'$. I then attach to the shaft R, by means of the knuckle-joint S, which is of the ordinary and well-known kind, the shaft $s$, which extends from the knuckle-joint to and operates the bevel-gearing upon the axle of the car, one end of shaft R, which extends in the direction of the car-axles, carrying one portion of the said joint, and the approaching end of shaft $s$ the other portion, and thereby a joint union is obtained by the shafts in rotation, and at the same time a free movement is provided for in attaching the shafts to a car-truck.

Upon the axle of the car I attach in a relative position to the car-wheels, a bevel gear, T, of suitable proportions, which is first split diametrically into two sections, the hub $t$ of said gear being adapted to fit around and near the center of the axle U, intermediately between the wheels, and the opposite sections bolted together, so as to attach the gear rigidly to the axle, the bolts being passed through the lugs $t^2$ on the hub, and also through the lugs $t^3$ on the web of the gear in separate order, as seen in Fig. 7. In close proximity to the bevel-gear T, I attach to said axle U the pinion-hangers V and V', said hangers being constructed to extend in a lateral direction from the axle U a suitable distance and from opposite sides of said axle, and are secured loosely upon said axle by the clamps $v^6$, which are with their respective portions of the hanger separately fitted around said axle and are bolted together by the bolts $v^8$, which pass through the extended portion $v^7$ of said clamps. The hangers V V' are made with a suitable curved extension, $v$, and the journal-boxes $v^2$, formed on the end of said extension. A recess, $v'$, is made between the extension $v$ having the journal-boxes $v^2$ and the portion V and also V' of the hanger, of the proper dimensions to receive the pinion W and permit its free rotation therein.

The journal-boxes $v^2$ are provided with a cap-plate, $v^4$, which is secured to the hanger-extension $v$ by the bolts $v^5$.

The pinion W is constructed with a hollow journal, $w'$, and a flange, $w$, the gear thereon being beveled, as seen in Fig. 9. The longitudinal opening through the pinion W is made square in form, and the sides of the said opening are inclined, as at $w^2$, from the flanged end portion of said pinion, and tapers to smaller dimensions until a portion of shaft $s$ may be easily introduced near the opposite end of the opening, where the sides of said opening are gradually increased in width, as seen at $w^3$.

The opening $v^2$ in the journal-boxes, which receives the journal $w'$ of the pinion W, is cylindrical in form, as seen in Fig. 8$^a$. The recess $v^3$ in the hanger, which is in direct line with the opening $v^2$ in the journal-boxes, is elongated toward the sides of said recess, as seen in Fig. 8$^b$, which recess receives the end of shaft $s$.

In the construction of shaft $s$ the portion of said shaft which enters the pinion W is made in a square form, as seen in Fig. 10, and the end portion which enters the recess $v^3$ of a round form, whereby the shaft $s$ is enabled to obtain a lateral end movement therein, while the pinion is permitted an opposite side and end movement in the recess $v^3$ and upon the shaft $s$, to conform to the movements of the car-truck. The pinion W is then inserted in the recess $v'$, between the journal-box and hanger, and meshing with the bevel-gear T on the axle, and the shaft $s$ is placed in the pinion so that the pinion will be turned by the square portion of said shaft and rotate freely in the journal-box.

Upon the opposite side of the axle U, and in hanger V, which is constructed similar to the hanger V', is placed a pinion, W', said pinion being supported in the journal-box attached to said hanger, and provided with bevel-gear thereon arranged in opposite relations to the gear of the pinion in the opposite hanger, and engaging with the bevel-gear T. The shaft $s'$ is attached to the said pinion W' in the same manner as the shaft $s$ is attached to pinion W upon the opposite side, and is similarly constructed. The rotation of the gear T serves to transmit power to pinion W' and thence to the shaft $s'$, and duplicate gear is attached in the same manner to the axle in rear and operated by said shaft $s'$.

In the operation of my improved mechanism for the purposes described, the opposite portions of the friction-clutch are retained by the spring $f^2$ in close contact, and upon throwing lever L to one side, as indicated in dotted lines, the clutch is disengaged and the driving-gear M ceases to operate. To change the speed of the car independently of the power conveyed to the gear mechanism, the lever $p$ is operated and the shaft P rotated, so as to draw the plunger from its engagement with one grooved gear to engage another, in which case a larger gear meshing with and actuating a small gear will produce an increased number of revolutions of the shaft R, and conversely a small gear actuating a large gear.

I have described one form of engaging the gear on the sleeve with said sleeve, whereby the gear are thrown in and out of joint union with the sleeve. I may, however, instead of the longitudinal slot, make perforations in the sleeve and registering with the grooves in the gear during the revolutions of the sleeve, and adapt the plunger to that form of engagement, and I may also mount the loose gear upon a solid shaft, and connect and disconnect the gear therewith by intercepting means arranged on the shaft, the object herein being to effect in opposite meshing series of variable gear the alternate engagement and disengagement of loose gear in the series with the power and mesh with and convey power to the meshing gear in fixed rotating relation.

In forming the concentric groove in the gear I may extend the same part way, thus making the stop or the entire distance around the central transverse opening and insert the stop thereafter. In this construction they will engage the gear with greater certainty than if made in the same transverse relation with the central opening. In the latter method the key will often fail to engage the groove when the shaft is rotating at high speed, owing to the inability of the spring to act upon the key at the proper moment, and the edge of the key becomes fractured by the contact.

The plunger, as described, is adapted to be withdrawn out of the sleeve to such an extent that the smallest actuating-gear will engage therewith, and has a reciprocating circular movement in rotary union with the sleeve.

In the practical application of the bevel-gear upon the axle under the car the said bevel-gear is placed upon an opposite side of a hanger to the one on the axle directly in front and in power connection, but is shown for illustration in a reverse position.

In the propulsion of the car the motion of the wheels may be reversed by changing the poles of the motor on the car, and when this is done the friction-clutch permits the shaft on the motor to rotate in an opposite direction without shock to the speed-gearing mechanism consequent upon the sudden reversal of motion.

Having fully described my invention, what I now claim as new, and desire to secure by Letters Patent, is—

1. In speed-changing mechanism, a gear provided with a central transverse cylindrical opening, and a shaft adapted to fit said opening, and a self-acting key on said shaft, and a concentric groove formed interiorly in said gear, and communicating with said central transverse opening, and a stop in said groove, substantially as described.

2. In speed-changing mechanism, the combination, with a sleeve provided with a longitudinal transverse slot or slots and adapted to be rotated, of one or more gear of varying diameter loosely mounted on said sleeve and provided with suitable grooves opening in the direction of the said sleeve, and a plunger provided with a circular rack, and having a key arranged in said plunger, and a spring in contact with said key adapted to operate as described, and pinions meshing with said rack upon opposite sides, and a lever engaging with said pinions, as described.

3. In speed-changing-mechanism, the combination, with a hollow shaft or sleeve provided with suitable slot or slots, of a reciprocating plunger-gear loosely mounted on said sleeve and provided with a suitable groove registering with said slots in the sleeve, and a self-acting key arranged in said plunger adapted to play in said slot in the sleeve and engage and disengage automatically with said groove in said gear, for the purpose described.

4. In speed-changing mechanism, the combination, with a sleeve grooved as described, and gear loosely mounted on said sleeve, and a plunger provided with an automatic key arranged to play in the slot in said sleeve, of the said loose gear having interior grooves and hardened metal stops in said grooves, for the purpose described.

5. In speed-changing mechanism, the combination, with a hollow shaft or sleeve provided with slot or slots extending through said sleeve, of a plunger in said sleeve provided with a key adapted to extend into said slot in said sleeve, and a circular rack on said plunger, and pinions on the opposite side of and meshing with said rack, and means for rotating said pinions, as described.

6. The combination, with the car-axle, of a hanger provided with a journal-box and a recess between said hanger and journal-box adapted to receive a pinion journaled in said box, as described.

7. The combination, with the hanger, of a journal-box, a recess between said journal-box and hanger, a pinion journaled in said journal-box and rotating in said recess, and provided with an angular opening through said pinion, and having the interior bearing-surfaces of said pinion inclined outwardly in opposite directions, and a shaft formed so as to fit within said pinion and rotate said pinion, as specified.

8. The combination, with a rotating shaft, of a hanger provided with a journal-box, a recess between the said journal-box and hanger, a pinion in said recess having a suitable journal and an angular opening through said pinion and journal, and oppositely-inclined interior bearing-surfaces, and a suitably-shaped shaft adapted to enter said pinion within said angular opening and rotate said pinion, and a recess in said hanger in opposite relations to said angular opening in said pinion, and elongated, as described, and adapted to receive the end of said shaft, as and for the purpose described.

9. The combination, with the power-conveying shaft provided with a flexible joint, of the car-axle and a hanger attached to said axle, and a pinion in said hanger having an angular inclined opening, as described, and the shaft within said opening, adapted to operate as described.

JOHN C. HENRY.

Witnesses:
SAMUEL J. VAN DORSTON,
EMMET H. ROSS.